United States Patent [19]

Murata et al.

[11] Patent Number: 4,776,001

[45] Date of Patent: Oct. 4, 1988

[54] RADIO TELEPHONE SYSTEM CONTROL APPARATUS AND METHOD

[75] Inventors: Yoshitoshi Murata, Yokosuka; Kazuhiro Yoshizawa, Kashiwa; Akio Yotsutani, Tokyo; Koichi Ito, Hino, all of Japan

[73] Assignees: Nippon Telegraph and Telephone Corporation; NEC Corporation, both of Tokyo; Kabushiki Kaisha Toshiba, Kanagawa, all of Japan

[21] Appl. No.: 900,589

[22] Filed: Aug. 26, 1986

[30] Foreign Application Priority Data

Aug. 27, 1985 [JP] Japan .................................. 60-187759

[51] Int. Cl.⁴ .............................................. H01Q 7/04
[52] U.S. Cl. ........................................ 379/62; 379/63
[58] Field of Search ...................... 379/58, 61, 62, 63

[56] References Cited

U.S. PATENT DOCUMENTS

| | | | |
|---|---|---|---|
| 4,352,955 | 10/1982 | Kai et al. | 379/110.1 |
| 4,538,028 | 8/1985 | Gazzoli et al. | 379/61 |
| 4,555,805 | 11/1985 | Talbot | 379/63 X |
| 4,612,415 | 9/1986 | Zdunek et al. | 379/58 |
| 4,661,970 | 4/1987 | Akaiwa | 379/63 X |

Primary Examiner—Robert Lev
Attorney, Agent, or Firm—Finnegan, Henderson, Farabow, Garrett & Dunner

[57] ABSTRACT

A method and an apparatus are disclosed for controlling a radio telephone system comprising a single master apparatus connected to a subscriber line and a plurality of radio telephone sets connected to the master apparatus by way of radio channel. When a call origination operation is made by one of the radio telephone sets, a call originating signal is sent to the master apparatus from the call originating radio telephone set. In response to the call originating signal, the master apparatus switches its radio channel to an idle speech channel, and sends a channel designating signal representing the idle speech channel to the plurality of radio telephone sets including the call originating radio telephone set so as to switch the radio channels of the radio telephone sets which have received the channel designating signal to the idle speech channel.

24 Claims, 11 Drawing Sheets

RADIO TELEPHONE SYSTEM CONTROL APPARATUS AND METHOD

BACKGROUND OF THE INVENTION

1. Field of the Invention

This invention relates to a radio telephone system control apparatus and a method for controlling the connection of a master apparatus connected to a wired telephone channel and a plurality of radio telephone sets connected by radio channels to the master apparatus, and more particularly to an apparatus for controlling the connection in response to the origination of a call by any one of the plurality of the radio telephone sets.

2. Description of the Related Arts

Among radio telephone systems comprising a master apparatus connected to wired telephone channels and one or more radio telephone sets connected to the master apparatus through radio channels may be mentioned a so-called cordless telephone apparatus, for example. A cordless telephone apparatus comprises a master apparatus connecting apparatus connected to wired telephone channels, and a wireless telephone set provided for the master apparatus in a one to one correspondence, and the frequencies of its signals are fixed such that up radio channels from the radio telephone sets to the master apparatus utilizes signals of frequency $f_1$, while down telephone channels from the master apparatus to the radio telephone sets utilize signals of frequency $f_2$. As a consequence, where two radio telephone sets are utilized, it is necessary to install two master apparatus.

With such a radio telephone system utilizing two radio telephone sets and two master apparatus, however, two radio telephone sets are not usually used simultaneously, so that provision of two master apparatus is not economical.

In recent years, for the purpose of efficiently utilizing allocated frequencies, multi-channel access systems have been adopted wherein a frequency being used is determined by utilizing a common channel, for example, a control channel among a plurality of master apparatus, and then the channel is switched to a speech channel corresponding to the frequency. However, when such a multi-channel access system is used there is a problem when either one of two radio telephone sets originates a call, or in what manner the channel should be switched to the speech channel. Furthermore, where more than two wired telephone sets are connected to one master apparatus, there is a problem in selecting the wired telephone channel to which the master apparatus should be connected.

SUMMARY OF THE INVENTION

It is therefore an object of this invention to provide a radio telephone system control apparatus and a method which enables a connection control with a single master apparatus where calls are originated by a plurality of radio telephone sets.

According to one aspect of this invention, there is provided a radio telephone system control apparatus comprising a plurality of radio telephone sets, each having a slave radio set; a master apparatus connected to a wired telephone channel and including a master radio set which exchanges signals between the slave radio sets of the radio telephone sets and master apparatus; means responsive to an origination operation of either one of the radio telephone sets for sending an origination signal from the slave radio set of the radio telephone set to the master radio set of the master apparatus; means responsive to the origination signal for sending a channel designating signal to the slave radio set of the radio telephone set from the master radio set of the master apparatus and for switching the radio channel of the master radio set of the master apparatus to the radio channel corresponding to the radio channel designating signal; means responsive to the channel designating signal for switching the radio channel of the slave radio set of the radio telephone set to that corresponding to the channel designating signal; whereby the connection control of the radio telephone set and a wired telephone channel is effected by a single master apparatus based on an origination of either one of a plurality of radio telephone set.

According to a modified embodiment of this invention, there is provided a radio telephone system control apparatus comprising a plurality of radio telephone sets each having a slave radio set; a master apparatus including a master radio set connected to at least one wired telephone channel for exchanging signals between the master apparatus and the slave radio set of the radio telephone set; means responsive to an origination operation of either one of the radio telephone sets for sending an origination signal of the master radio set of the master apparatus from the slave radio set of the radio telephone set which has generated an origination; means responsive to the originating signal for detecting a state of use of a wired telephone channel connected to the master apparatus for sending an idle office line signal representing an idle telephone channel to a slave radio set of the originated telephone set from the master radio set of the master apparatus; means provided for the radio telephone set for displaying an idle telephone channel based on the idle office line signal; means for sending an office line designating signal from the slave radio set of the originated radio telephone set to the master radio set of the master apparatus in accordance with a selection of the idle telephone channel of the originated radio telephone set; means responsive to the office line designating signal for sending a channel designating signal to the slave radio set of the radio telephone set from the master radio set of the master apparatus and for switching the radio channel of the master radio set of the master apparatus to a radio channel corresponding to the channel designating signal, whereby controlling the connection of a radio telephone set and a wired telephone channel corresponding to an office line designating signal with a single master apparatus in accordance with an origination from either one of a plurality of radio telephone sets.

According to another embodiment of this invention, there is provided radio telephone system control apparatus comprising a plurality of radio telephone sets each including a slave radio set; a master apparatus including a master radio set connected to at least one wired telephone channel for exchanging signals between the slave radio set of the radio telephone set and the master radio set; means for sending an origination signal to the master radio set of the master apparatus from the slave radio set of the originated radio telephone set when either one of the radio telephone sets originates; means responsive to the origination signal for detecting the state of use of a wired telephone channel connected to the master control apparatus; means for sending a channel designating signal to the slave radio set of the radio telephone set from the master radio set of the master apparatus when an idle telephone channel is detected by the detecting means; means for switching a radio channel of the master radio set of the master apparatus to a radio channel corresponding to a channel designating signal; means responsive to the channel designating signal for switching the radio channel of the slave radio set of the radio telephone set to a radio channel corresponding to the channel designating signal, whereby the connection control, based on the orientation of either one of a plurality of radio telephone sets, between the originated radio telephone set and a wired telephone channel is effected by a single master apparatus.

According to another aspect of this invention, there is provided a method of controlling a radio telephone system of the type wherein connections between a wired telephone channel and a plurality of radio telephone sets are controlled by a single master apparatus, the method comprising the steps of sending an origination signal from an originated radio telephone set to the master apparatus when either one of the telephone sets originates; connecting a radio channel of the master apparatus and the radio channels of all radio telephone sets to the same channel when an origination signal is generated by the one radio telephone set; and establishing a speech channel between the originated radio telephone set and a wired telephone channel to the master apparatus.

According to a modification, there is provided a method of controlling a radio telephone system of the type wherein connections between a wired telephone channel and a plurality of radio telephone sets are controlled by a single master apparatus connected to at least one wired telephone channel, the method comprising the steps of sending an origination signal to the master apparatus from an originated radio telephone set when either one of the radio telephone sets originates; in response to the origination signal, detecting a state of use of a wired telephone channel connected to the master apparatus; sending an idle office line signal representing an idle telephone channel to an original radio telephone set from the master apparatus; displaying the idle telephone channel in response to the idle office line signal in the originated radio telephone set; sending an office line designating signal to the master apparatus from the originated radio telephone set when an idle telephone channel for the originated radio telephone set is detected; sending a channel designating signal to the radio telephone set from the master apparatus in response to the office line designating signal; switching a radio channel of the master apparatus to a radio channel corresponding to the channel designating channel; switching the radio channel of the radio telephone set to a radio channel corresponding to the channel designating signal in response to the channel designating signal; and establishing a speech channel between the originated radio telephone set and the selected wired telephone channel.

DESCRIPTION OF THE PREFERRED EMBODIMENT

Figure 1:
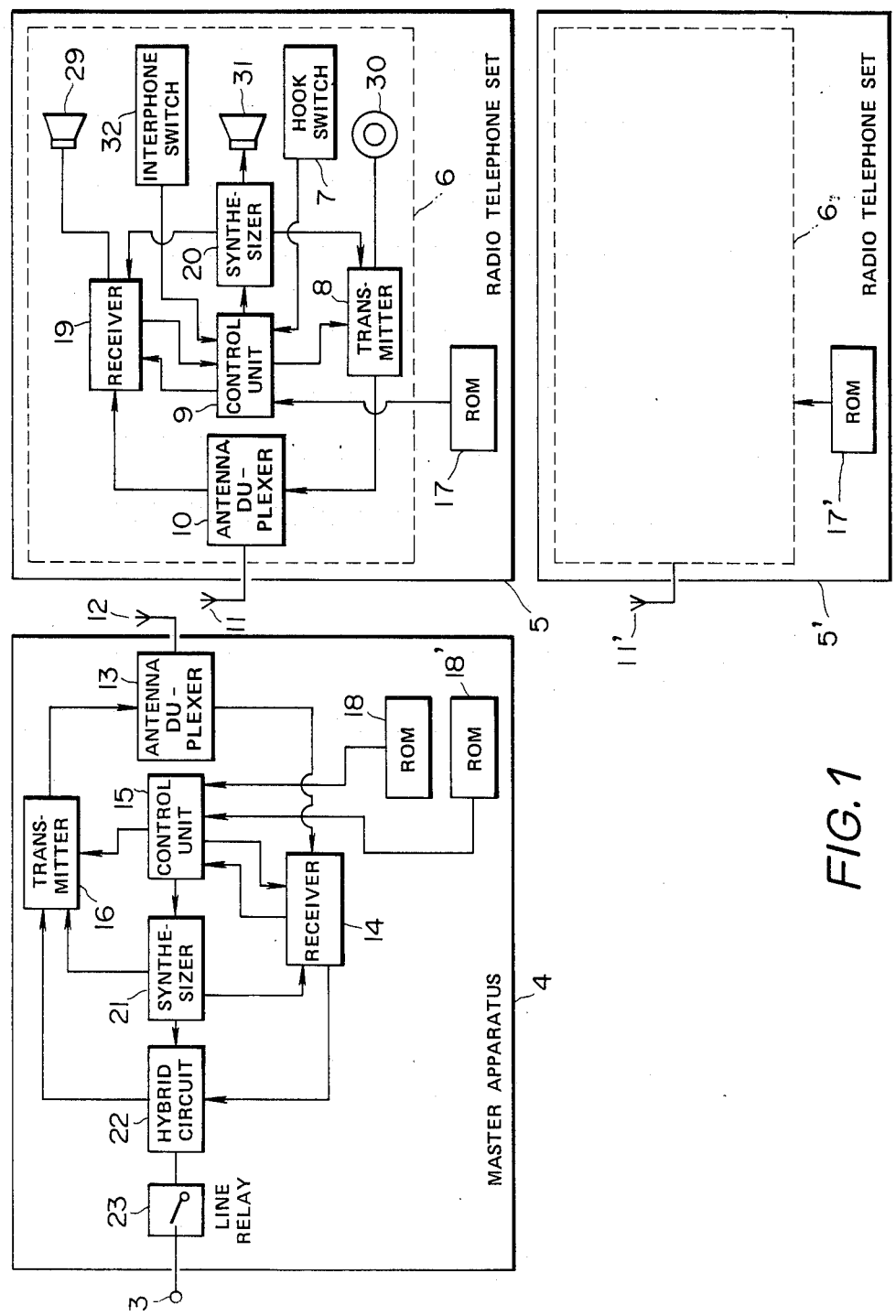
FIG. 1 is a block diagram showing the details of one embodiment of this invention.

A preferred embodiment of the radio telephone system according to this invention shown in FIG. 1 comprises one master apparatus 4 and two radio telephone sets 5 and 5'. For the purpose of simplifying the description, only two radio telephone sets are shown but it will be clear that the invention is also applicable to three or more radio telephone sets. The master apparatus 4 is connected to a wired telephone channel also called a subscriber line, not shown, through a terminal 3. A signal from the wired telephone channel input to terminal 3 is supplied to a transmitter 16 via a line relay 23 and a hybrid circuit 22, while the output from the transmitter 16 is sent out from an antenna 12 via an antenna duplexer 13. On the other hand, a signal received by antenna 12 is supplied to a receiver 14 through antenna duplexer 13, and the output from the receiver 14 is supplied to the wired telephone channel via hybrid circuit 22, line relay 23 and terminal 3. A synthesizer 21 is provided for determining the radio frequency of the transmitter 16 and the receiver 14, and a control unit 15 is provided for the purpose of controlling transmitter 16, receiver 14 and synthesizer 21. Read only memory devices (ROM) 18 and 18' are provided for the purpose of storing identification information for controlling the connections to radio telephone sets to be described later, the identification information being used in the control unit 15.

The radio telephone sets 5 and 5' are connected to the master apparatus through wireless channels. The wireless telephone sets 5 and 5' have the same construction except that their ROMs 17 and 17' store different information. More particularly, element 6 bounded by dotted lines in FIG. 1 has the same construction for both telephone sets 5 and 5' so that in the following description, elements utilized in radio telephone set 5' are designated by the same reference numerals as those used in the radio telephone set 5 except addition of a prime. The signal transmitted from the master apparatus is received by an antenna 11 and applied to a receiver 19 through an antenna duplexer 10, and the output of the receiver 19 is supplied to a handset or loudspeaker 29 to be connected to generate sound. A signal input to a microphone 30 is sent to the master apparatus 4 via transmitter 8, antenna duplexer 10, and antenna 11. A synthesizer 20 is provided for determining the radio frequency of receiver 19 and transmitter 8, while a control unit 9 is provided for controlling receiver 19, transmitter 8 and synthesizer 20. A loudspeaker 31 connected to the synthesizer produces a call tone. A hook switch 7 is provided to originate a call and to respond to the call tone produced by the loudspeaker 31.

The information stored in ROMs 17 and 17' correspond to that stored in ROMs 18 and 18' of the master apparatus 4.

This embodiment employs a multichannel access system comprising a single control channel (C-CH) and a plurality, for example 45, of speech channels. Thus a speech channel is established by commonly utilizing a single control channel by a plurality of apparatus. The operation of this embodiment will be described with reference to the flow charts shown in FIGS. 2 through 6.

Figure 2:
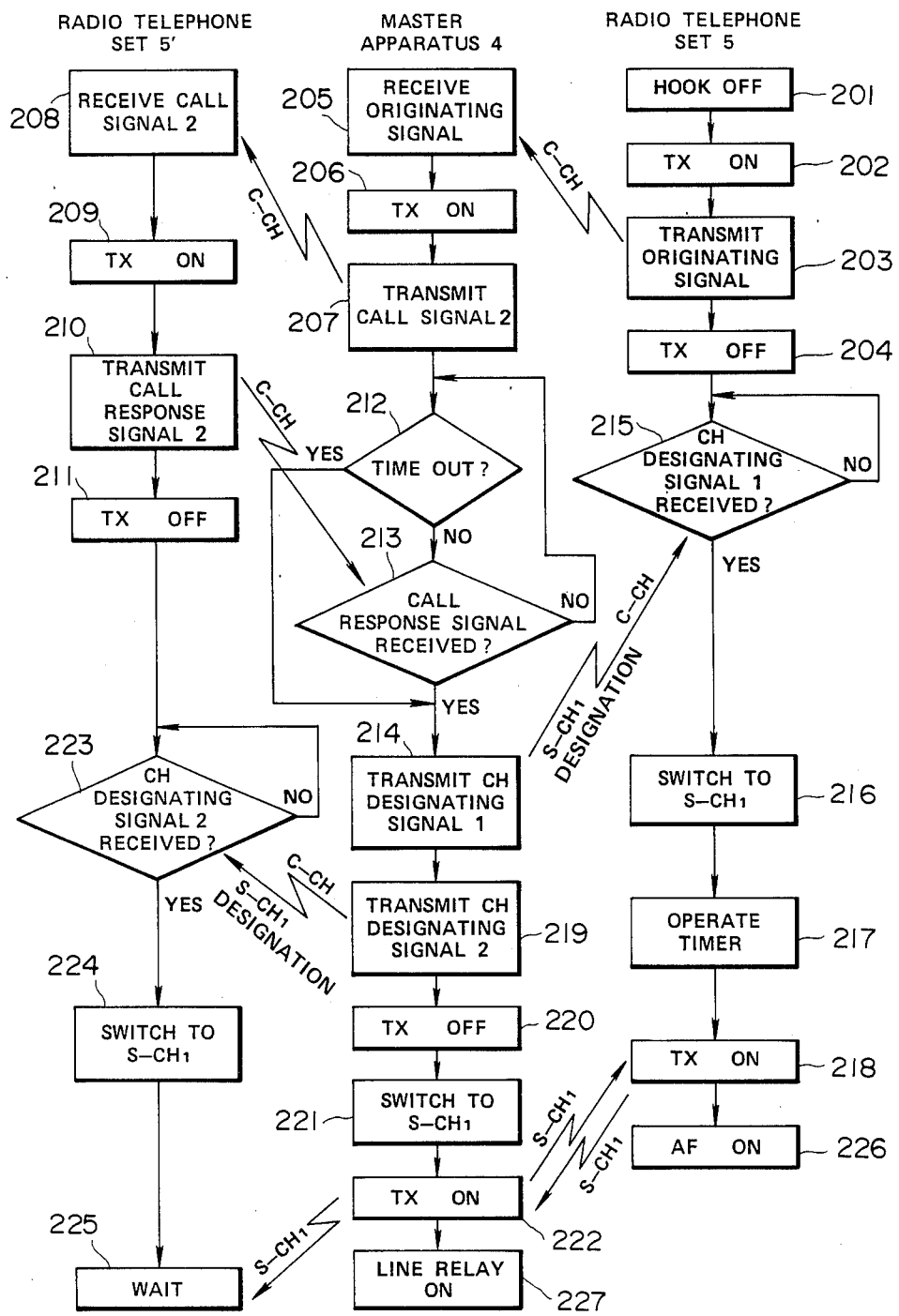
FIGS. 2 through 6 are flow charts showing the operation of the embodiment shown in FIG. 1.

FIG. 2 shows a flow chart for the case when a call is originated by radio telephone set 5. At step 201, when the hook switch 7 of the radio telephone set 5 is taken off-hook at step 202, this state change is detected by control unit 9 and this unit 9 turns ON the transmitter 8, and then at step 203 the call originating signal is sent to the master apparatus 4 via antenna duplexer 10 and antenna 11. The transmission of the call originating signal from the radio telephone set 5 to the master apparatus 4 is made by using the control channel (C-CH). Upon termination of the transmission of the call originating signal, at step 204, the control unit 9 turns off the transmitter 8. At step 205, the master apparatus 4 receives with receiver 14 the call originating signal via antenna 12 and antenna duplexer 13 and the demodulated output from the receiver 14 is applied to the control unit 15. Then at step 206, the control unit 15 turns ON transmitter 16 for transmitting a call signal to radio telephone set 5' at step 207. The transmission of the call signal from the master apparatus 4 to the radio telephone set 5' is performed by using the control channel (C-CH). For the purpose of selectively sending the call signal to the radio telephone set 5', identifying stored in the ROM 18' information is incorporated into the call signal. When the radio telephone set 5' receives the call signal, it compares the identifying signal contained in the call signal with the information stored in ROM 17', and when they coincide with each other, the radio telephone set 5' accepts the call signal. In the following, a digit '2' shows a signal containing the identifying signal stored in ROM 18', while a digit '1' shows a signal containing an identifying signal stored in ROM 18. An identifying signal stored in ROMs 18, 18', 17 and 17' is made up of a identifyng code common to both radio telephone sets 5 and 5' and individual identifying codes assigned to respective radio telephone sets 5 and 5'. The common identifying code is used to identify the other radio telephone set.

At step 208, the radio telephone set 5' receives a call signal 2 transmitted from the master apparatus 4 by receiver 19' through antenna 11' and antenna duplexer 10'. The demodulated output from receiver 19' is supplied to control unit 9' whereby it turns ON transmitter 8' at step 209, and a call response signal 2 is sent to the master apparatus 4 at step 210. As has been pointed out before, the call response signal 2 contains an identifying signal stored in ROM 17'. Upon termination of the call response signal 2, at step 211, the control unit 9' of the radio telephone system 5' turns OFF transmitter 8'.

After sending the call signal 2 at step 207, at step 212 the master apparatus 4 executes a judgement as to whether a predetermined time has elapsed or not. When the result of judgement shows that the predetermined time has not yet elapsed, that is, time out has not occurred, the program is transferred to step 213 at which a judgement is made as to whether receiver 14 has received a call response signal 2 from radio telephone set 5' or not. When the result of judgement at step 213 is NO, the program is returned to step 212. When result of judgement at step 212 shows a time out and when the result of judgement at step 213 shows receipt of a call response signal 2, the program is transferred to step 214. More particularly, when a predetermined time has elapsed after sending out a call signal 2 from the master apparatus 4, or when a call response signal 2 is received from radio telephone set 5', the program is transferred to step 214.

At step 214, a channel designating signal 1 for designating a predetermined channel is transmitted to radio telephone set 5 by using the control channel. At step 215, the radio telephone set 5 executes a judgement as to wheter the radio telephone set 5 has received the channel designating signal 1 or not. When the result of judgement is YES, the control unit 9 controls the synthesizer 20 for switching the radio frequency of transmitter 8 and receiver 19 to that corresponding to a predetermined speech channel (S-CH$_1$) at step 216. After that, at step 217 a timer is operated and after a predetermined time, the transmitter 8 is turned ON at step 218.

Following the transmission of the channel designating signal at step 214, at step 219, the master apparatus 4 sends out a channel designating signal 2 to radio telephone set 5' by using the control channel. The channel designating signal 2 designates the same speech channel as the channel designating signal 1. Upon completion of the transmission of the channel designating signal, at step 220, the master apparatus 4 turns OFF transmitter 16 so as to control the synthesizer 21, thereby switching the transmission/reception frequency to that corresponding to speech channel (S-CH$_1$) and then turning ON transmitter 16 at step 222. As a consequence, speech between the master apparatus and the radio telephone set 5 becomes possible by utilizing the speech channel (S-CH$_1$).

At step 223, in radio telephone set 5' a judgement is made as to whether the channel designating signal 2 sent from the master apparatus 4 has been received or not. When the result of judgement executed at step 223 is YES, the program is advanced to step 224 at which the transmission/reception frequency is switched to that corresponding to speech channel (S-CH$_1$) and at step 235, the state is changed to a waiting state. Under this state since the transmitter 8' at the radio telephone set 5' is OFF, the radio telephone set 5' can receive only a signal from the master apparatus 4 utilizing speech channel (S-CH$_1$).

After turning ON the receiver 8 at step 218, the radio telephone set 5 turns ON the audio frequency circuit of the transmitter 8 and receiver 19 at step 226. At step 222, the master apparatus turns ON transmitter 16 and turns ON line relay 23 at step 227 for closing a relay contact, whereby radio telephone set 5 can make speech through a wired telephone channel connected to terminal 3 of the master apparatus 4 by using a handset 29 and microphone 30. In this state, when the hook switch 7' of the radio telephone set 5' now in the waiting state is hooked OFF, the reception of the speech is possible but transmission thereof is impossible.

The operation of a case wherein a ring signal is received by the master apparatus from the wired telephone channel will be described as follows.

Figure 3:
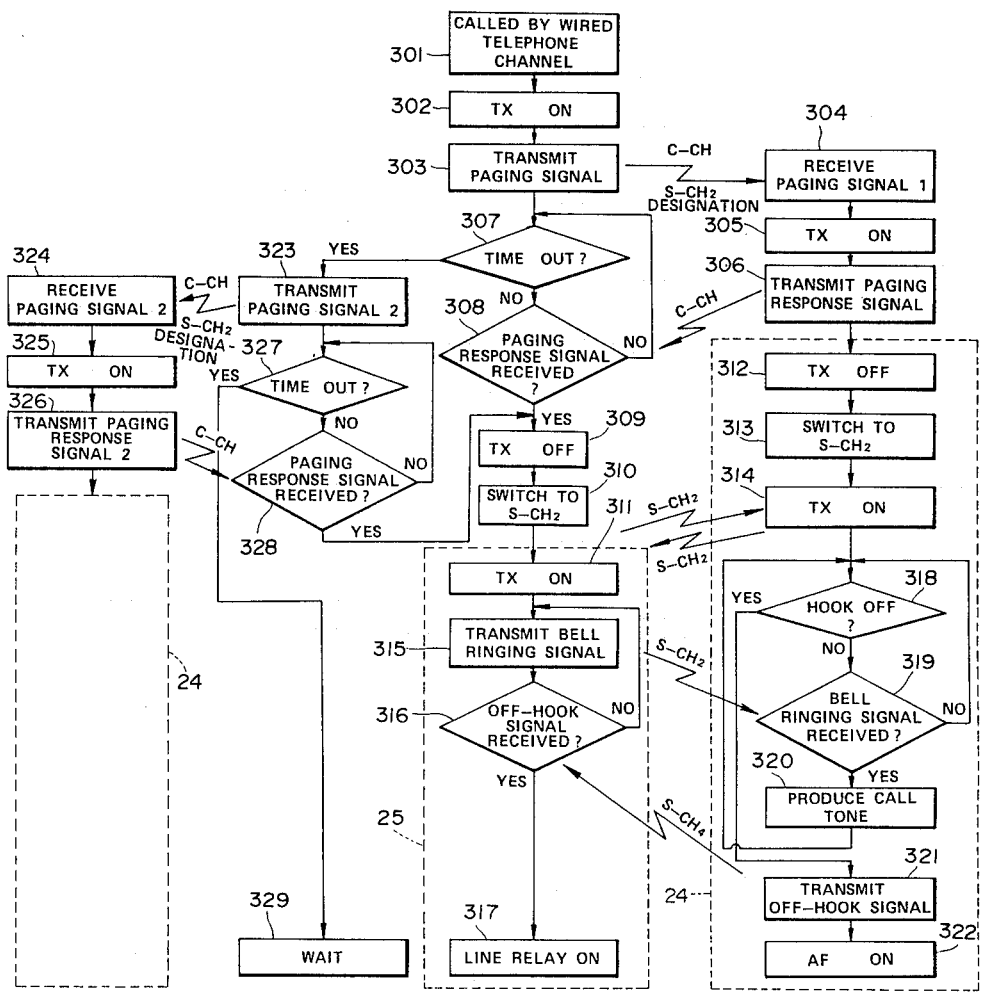

FIG. 3 shows a flow chart showing the operation of a case in which the master appartus receives a ring signal from a wired telephone channel. The detection of the ring signal is made by judging the presence or absence of the ring signal by the control unit 15 based on the output signal of a detecting circuit, not shown, connected to the wired telephone channel. At step 301, when a ring signal is received by the master apparatus, in other words, when the same is called by the wired telephone channel, at step 302 the master apparatus turns ON the transmitter 16 so as to send out a paging signal containing a designating signal that designates a predetermined speech channel at step 303. The paging signals are sent to respective radio telephone sets in a predetermined order of priority which is determined by the order of inserting IC sockets into ROMs 18 and 18' or by the order of information prestored in ROMs 18 and 18'. The order of priority may be set by an independent switch or the like, or may be randomly set by generating a suitable random number. Further, the order of priority can be set according to the hysteresis of the connection to the wired telephone channel. Thus, for example, the last used radio telephone set or the radio telephone set most frequently used can be set to the highest priority.

In the flow chart shown in FIG. 3, the radio telephone set 5 is a higher priority than the radio telephone set 5'. Thus, at step 303, a paging signal 1 is sent to radio telephone set 5. At step 304, when the radio telephone set 5 receives the paging signal 1, transmitter 8 is turned ON at step 305, and a paging response signal 1 is sent to the master apparatus at step 306.

The master apparatus 4 monitors the paging response signal 1. When the paging signal is received within a predetermined interval after sending out the paging signal 1 at step 303. More particularly, at step 307, when it is judged that there is no time out, and at step 308, when it is judged that the paging response signal 1 has been received, the program is transferred to step 309 for turning OFF receiver 16. Then at step 310, a radio channel is switched to a speech channel (S-CH$_2$). After that at step 311, the transmitter 16 is turned ON.

At step 306, upon termination of the transmission of the paging response signal 1, at step 312, the radio telephone set 5 turns OFF transmitter 8 to switch the radio channel to the speech channel (S-CH$_2$). After that, at step 314, transmitter 8 is turned ON again, thereby establishing speech channel between master apparatus and radio telephone set 5 by utilizing the speech channel (S-CH$_2$).

At step 311, the master apparatus turns ON transmitter 16 and then at step 315, the master apparatus sends out a bell ringing signal by using the speech channel (S-CH$_2$). At step 319 as the radio telephone set 5 receives the bell ringing signal, at step 320, call tone is produced from loudspeaker 31. At step 318 when the hook switch 7 is taken off-hook in response to the call tone, at step 321, an off-hook signal is sent to the master apparatus 4 through the speech channel (S-CH$_2$). Then at step 322, the audio frequency circuit is turned ON.

At step 316 when the master apparatus receives the off-hook signal from the radio telephone set, at step 317, the line relay 23 is turned ON, whereby the radio telephone set 5 can exchange speech with a wired telephone channel through the master apparatus 4.

At step 307, when time out is judged, that is where a paging response signal 1 is not returned from the radio telephone set after elapse of a predetermined interval, after sending out of the paging signal, at step 323 a paging signal 2 for the radio telephone set at the next order of priority is sent out. At step 324, when the radio telephone set 5' receives the paging signal 2, at step 325, the transmitter 8' is turned ON to send out the paging response signal 2 at step 326. When this paging response signal 2 is received by the master apparatus 4 within a predetermined interval after sending out the paging signal 2, the program is transferred to step 309 at which the transmitter 16 is turned OFF, and then the channel is switched to speech channel (S-CH$_2$), whereby the transmitter 16 is turned ON again to send out a bell ringing signal at step 315.

After sending out the paging response signal 2, the radio telephone set 5' executes the same operations as the radio telephone set 5 with respect to a portion 24 of the flow chart bounded by dotted lines. More particularly, transmitter 8' is turned OFF first for switching the channel to the speech channel (S-CH$_2$) and turning ON again the transmitter 8'. When a bell ringing signal is received from the master apparatus, a call tone is sent out. When the hook switch 7' is off-hooked in response to the call tone, an off-hook signal is sent out and then the audio frequency circuit is turned ON.

At step 316, when the master apparatus receives an off-hook signal from radio telephone set 5', at step 317, the line relay is turned ON so as to connect the radio telephone set 5' to the wired telephone channel via the master apparatus.

When the time out is judged at step 327, that is when no paging response signal 2 is sent back from radio telephone set in a predetermined interval even though a paging signal 2 has been sent out, the program is transferred to step 329, thus bringing the master apparatus to the waiting state.

Figure 4:
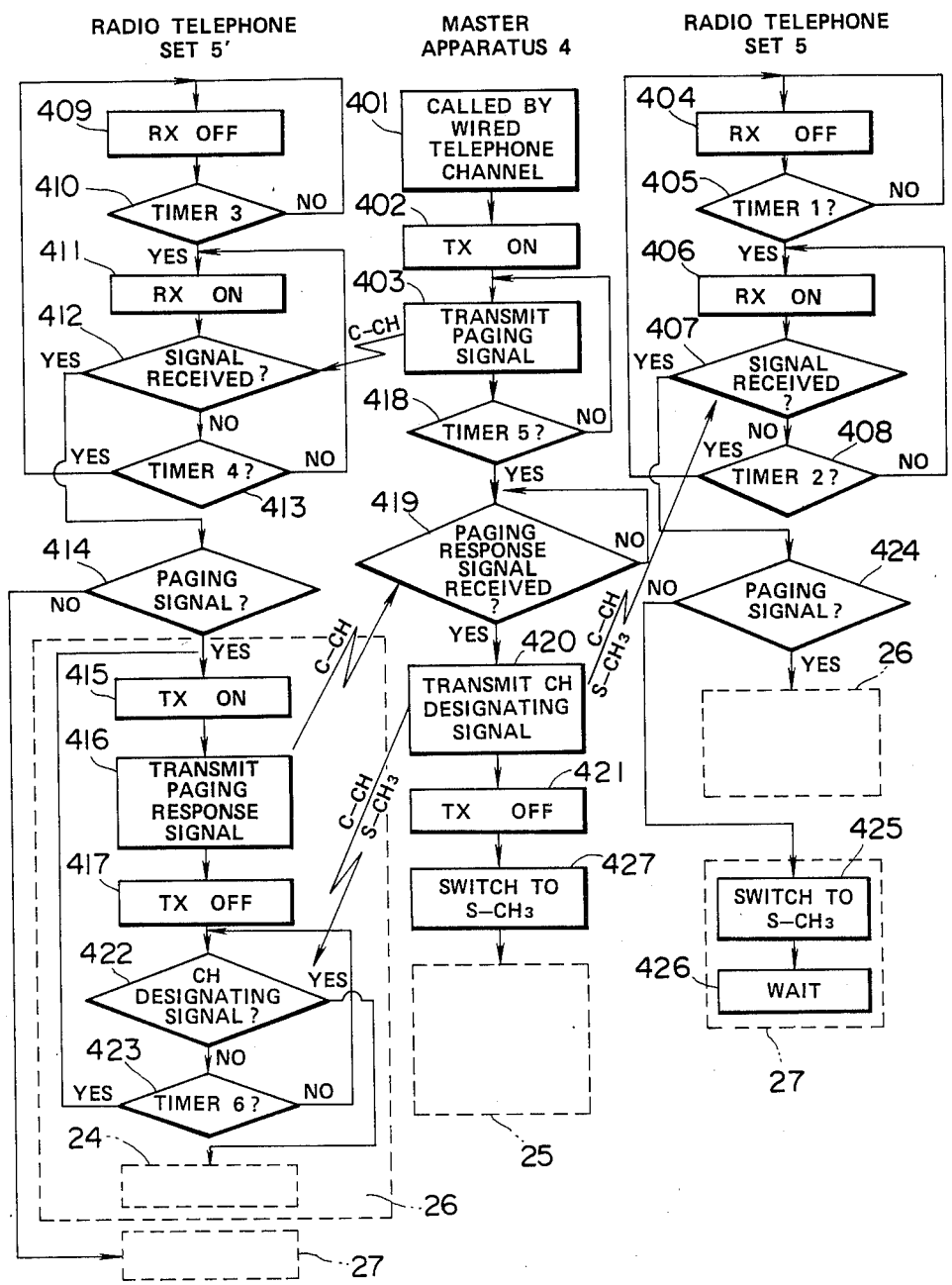

FIG. 4 shows another flow chart in a case where a ring signal is received by the master apparatus from a wired telephone channel. As can be noted from this flow chart, radio telephone set 5 and 5' intermittently receive signals at different periods and the master apparatus sends a paging signal containing only the common identifying code. When either one of the radio telephone sets 5 and 5' (in the flow chart telephone set 5') respond to the paging signal, both radio telephone sets 5 and 5' are connected to the predetermined speech channel (S-CH$_2$) so as to cause telephone set 5' to generate a call tone, and telphone set 5' which went off-hook in response to the call tone is connected to the wired telephone channel, whereas the radio telephone set 5 is brought to the waiting state.

At step 401 when there is a ring signal on the wired channel, at step 402, the master apparatus 4 turns ON transmitter 16 for transmitting a paging signal over the control channel (C-CH) at step 403. As above described, the paging signal contains only the common identifying code.

In a condition when radio telephone sets 5 and 5' do not receive any signal, they intermittently receive the signal at a predetermined period (battery saving operation). More particularly, at step 404, radio telephone set 5 turns OFF receiver 19 and as the set time of the timer 1 elapses it turns ON receiver 19 at step 405. On the other hand, at step 407 where there is no received signal and the set time of timer 2 has elapsed at step 408, the receiver 19 is turned OFF again. In the same manner, at step 409 radio telephone set 5' turns OFF receiver 19'; and as the set time of time 3 has elapsed at step 410, the receiver 19' is turned ON. At step 412 where there is no signal received, and at step 413 the set time of timer 4 has elapsed, the receiver 19' is turned OFF again.

Suppose now that a paging signal transmitted from master apparatus 4 at step 403 is received by radio telephone set 5' and that the reception is determined at step 412. In this case, the program is transferred to step 414 so as to make a judgement as to whether the received signal is a paging signal or not. When the signal is the paging signal, at step 415, transmitter 8' is turned ON for sending out a paging response signal at step 416 and for turning OFF the transmitter 417 at step 417. When the paging response signal is received by the master apparatus 4 at step 419 in a predetermined interval after sending out the paging signal at step 403, the master apparatus 4 sends out a channel designating signal that designates a predetermined speech channel at step 420. After that, at step 421, transmitter 16 is turned OFF. When the radio telephone set 5 receives the channel designating signal at step 423 in a predetermined interval after sending out the paging response signal at step 416, and when the received signal is judged as the channel designating signal at step 422, the program is transferred to the flow chart shown by dotted line block 24. This flow chart is the same as the flow chart in block 24 shown in FIG. 3.

At step 407, the channel designating signal transmitted from the master apparatus 4 is judged by radio telephone set 5, and then the program is transferred to step 424. In this case, since the signal is not the paging signal, after switching the channel to speech channel (S-CH$_3$) at step 425, and the telephone set is brought the waiting state at step 426.

At step 421, after turning OFF transmitter 16, the master apparatus switches the channel to the speech channel (S-CH$_3$) at step 427 and then the program is transferred to the flow chart shown by block 25. The flow chart shown by this block 25 is the flow chart shown by block 25 in FIG. 3. In FIG. 4, two flow charts shown by each of blocks 26 and 27 are the same, respectively.

Figure 5:
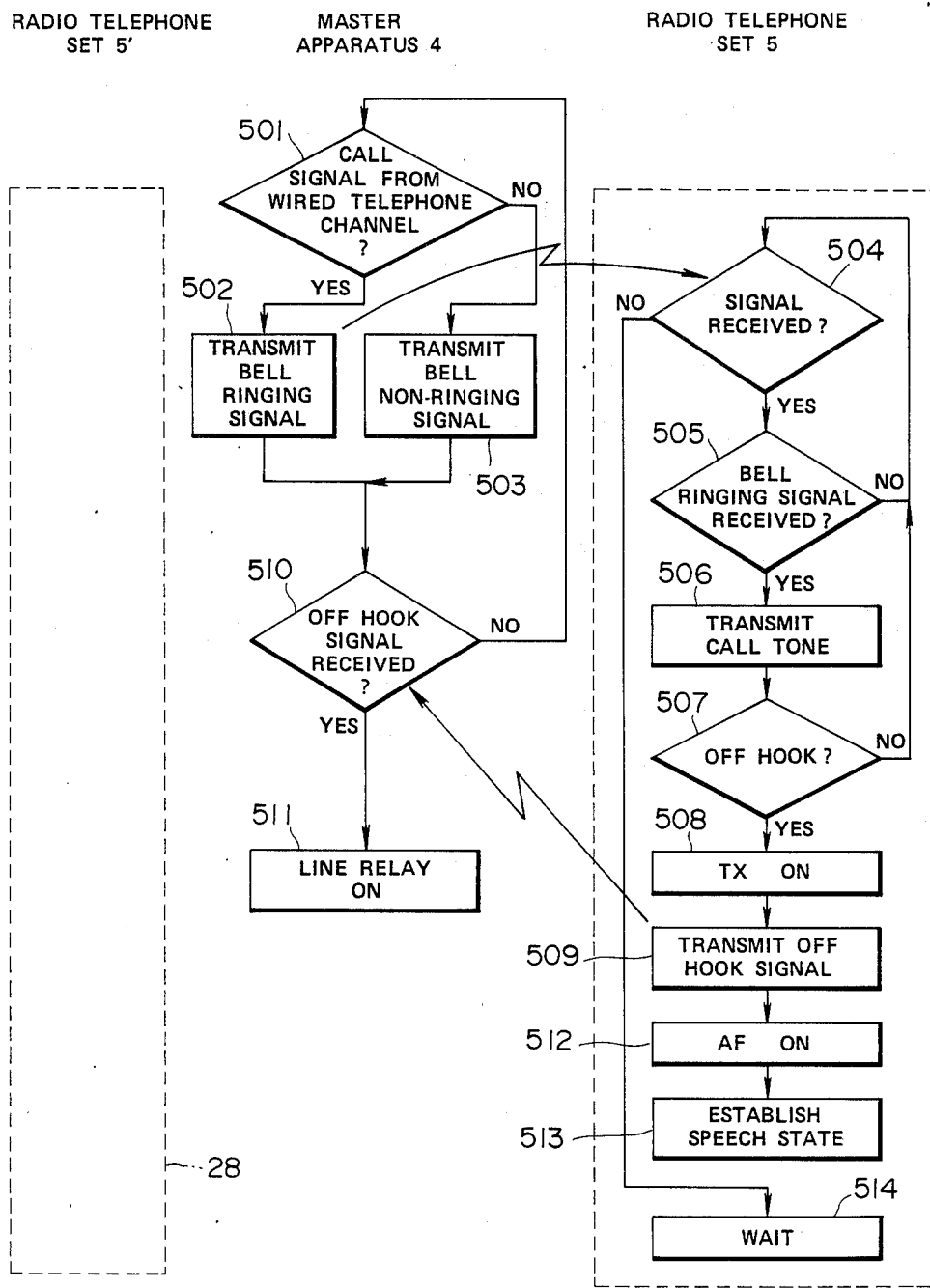

FIG. 5 shows a flow chart where a ring signal is received from the wired telephone channel. The flow chart shown in FIG. 5 is a flow chart after the master apparatus 4 and the radio telephone sets 5 and 5' are connected to the same speech channel in the same manner as the flow chart shown in FIG. 4. At step 501, the master apparatus 4 judges as to whether there is a ring signal from the wired telephone channel. When it is judged that there is a ring signal on the wired telephone channel, at step 502, a bell ringing signal is transmitted, whereas when it is judged that there is no ring signal on the wired telephone channel, at step 503, a bell not ringing signal is sent out. Whether the bell ringing signal is received or not is judged by radio telephone set 5, for example at step 504.

At step 505, when it is judged that the received signal is the bell ringing signal, a call tone signal is sent out at step 506, and the hook switch 7 is hooked OFF at step 507 in response to the call tone. Then, transmitter 8 is turned ON at step 508 to send out an off-hook signal at step 509 which is received by master apparatus 4 at step 510, whereby the master apparatus 4 turns ON the line relay 23 at step 511. At step 509, after sending out the off-hook signal, the radio telephone set 5 turns ON the audio frequency circuit at step 512, thus establishing a speech state at step 513.

At step 505, when it is judged that the bell ringing signal is not received, and at step 507, when it is judged that the hook switch is ON at step 507, that is when it is judged that the hook switch is not OFF, the program is returned to step 504. At step 510, when it is judged that an OFF hook signal is not yet received, the program is returned to step 501. At step 504, when it is judged that no signal is received, the program is returned to step 514 to bring the state to the waiting state. More particularly, with the flow chart shown in FIG. 5, when there is a ring signal on the wired telephone channel, both radio telephone sets 5 and 5' generate a call tone signal so that the first radio telephone set taken off-hook assumes a speech state, while the other radio telephone set assumes a waiting state because there is no signal received. In this case, by using only the bell ringing signal the circuit is set to the waiting state when the bell ringing signal does not arrive for a predetermined interval.

Figure 6:
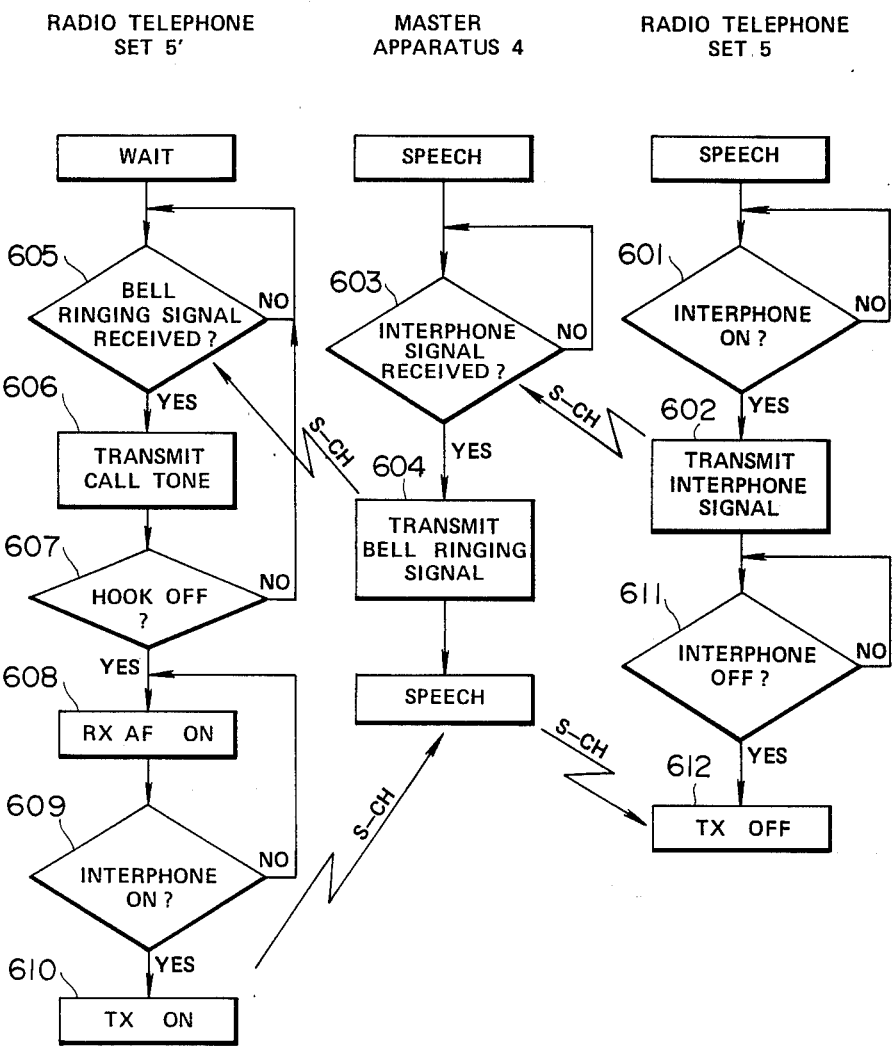

FIG. 6 is a flow chart useful to explain the interphone operation between the radio telephone sets of the radio telephone system according to this invention. Suppose now that radio telephone set is in a speech mode while the other radio telephone set 5' is in the waiting state. Under this state, when an interphone switch 32 of the radio telephone set 5 is turned ON at step 601, the radio telephone set 5 sends out an interphone signal by using a speech channel at step 602. At step 603, when the master apparatus 4 receives this interphone signal, at step 604, the master apparatus 4 sends out the bell ringing signal through the speech channel. At step 605, when the radio telephone set 5' receives the bell ringing signal, the telephone set 5' sends out the call tone signal and when this telephone set becomes off-hook state in response to the call tone signal at step 607 and the audio frequency circuit of receiver 19' is turned ON at step 608, so that the radio telephone set 5' is set to a speech receive mode. On the other hand, the radio telephone set 5 can make speech while the interphone switch 32 is ON. Under this state, when the interphone switch 32' of the telephone set 5' is turned ON at step 609, the transmitter 8' of the radio telephone set 5' is turned ON at step 610, whereby the telephone set 5' can exchange speech. When the interphone switch 32 is turned OFF at step 611, the transmitter 8 of the telephone set 5 is turned OFF at step 612, thus enabling only reception. In such an interphone state, unidirectional speech between telephone sets 5 and 5' becomes possible by using interphone switches 32 and 32' as press-to-talk switches.

When a system shown in FIG. 5 is adopted by using the interphone signal as a transfer signal, transfer of signals from telephone set 5 to telephone set 5' becomes possible. When the transfer is made possible as above described, a special ringing tone may be issued that represents the transfer of the signal. It is possible to provide secret speech by providing a secret speech button switch and by operating this switch to disable reception by a telephone set other than the radio telephone set capable of effecting bidirectional speech.

Figure 7:
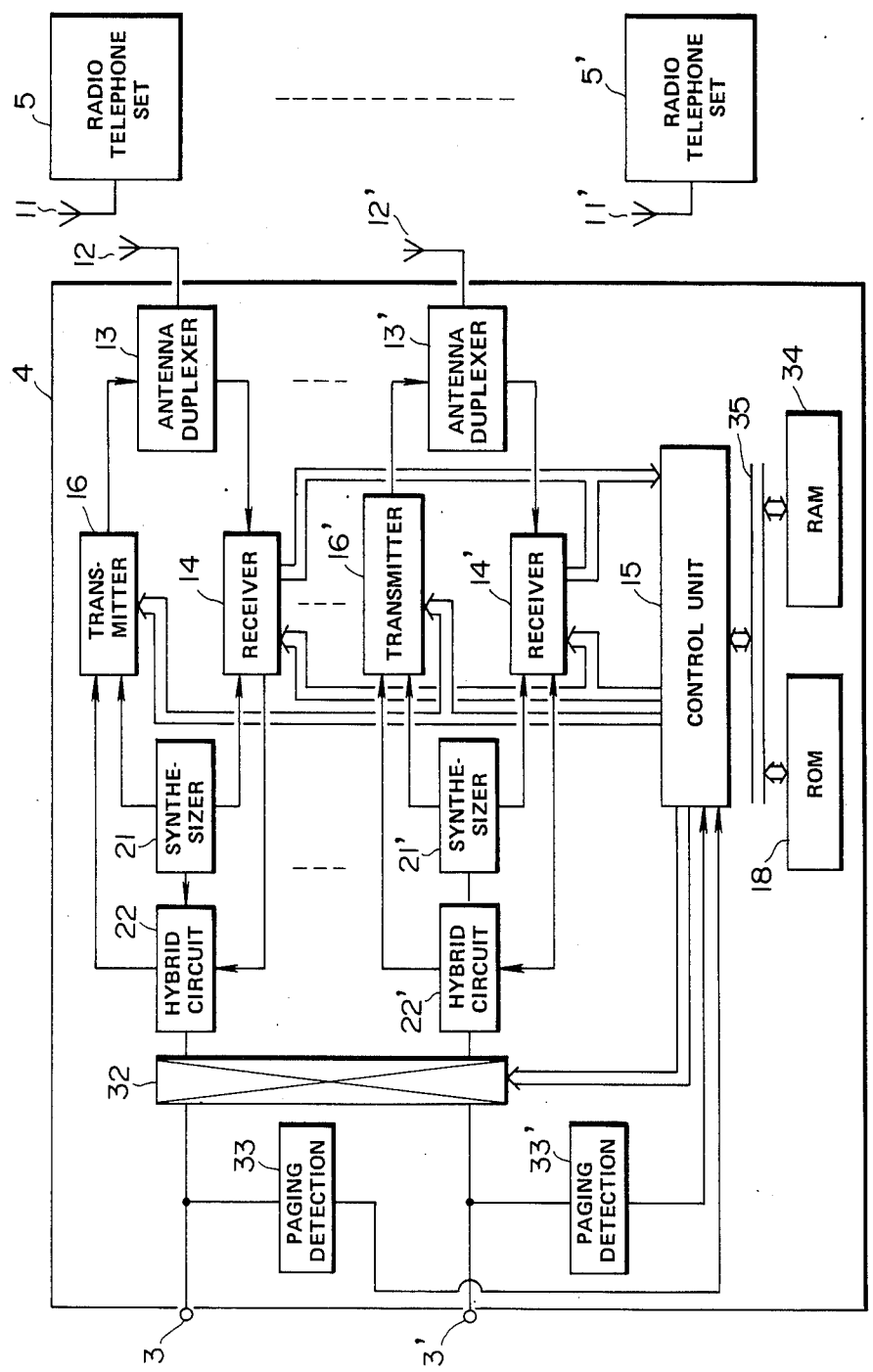
FIGS. 7 and 8 are block diagrams showing the details of another embodiment of this invention.
Figure 8:
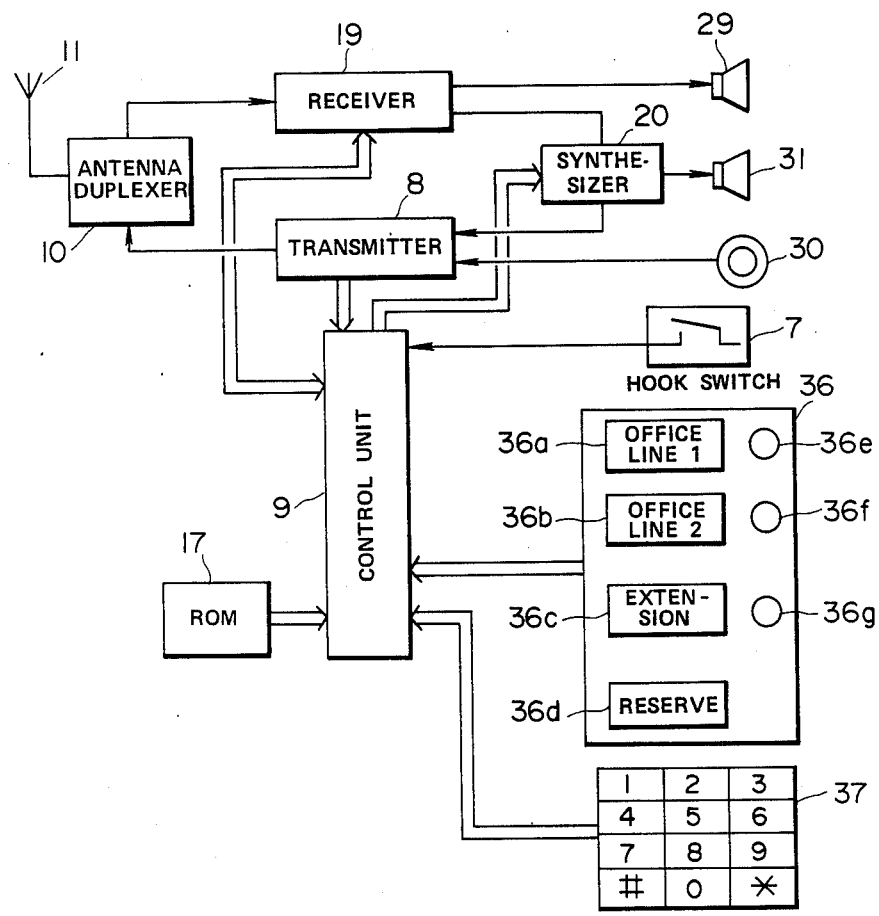

FIG. 7 is a block diagram showing another embodiment of the radio telephone system according to this invention. In FIGS. 7 and 8, elements performing the same functions as those shown in FIG. 1 are designated by the same reference numerals. In the radio telephone system of this embodiment, the master apparatus 4 is connected to two wired telephone channels, not shown, via terminals 3 and 3' for constituting two pairs 16 and 14 and 16' and 14' of transmitters and receivers.

A signal input to terminal 3 from a wired telephone channel is supplied to transmitter 16 or 16' via a crosspoint 32 and hybrid circuit 22 or 22', while the output of transmitter 16 or 16' is broadcast through antenna 12 or 12' via antenna duplexer 13 or 13'.

A signal received by antenna 12 is applied to receiver 14 via antenna duplexer 13, while the output of receiver 14 is output to either one of the wired telephone channels connected to terminal 3 or 3' via hybrid circuit 22 and crosspoint 32. A signal received by antenna 12' is supplied to receiver 14' via antenna duplexer 13', while the output of receiver 14' is sent to either one of the wired telephone channels connected to terminal 3 or 3' via hybrid circuit 22' and crosspoint 32. Synthesizers 21 and 21' respectively determines the radio frequencies of transmitter 16, receiver 14, transmitter 16' and receiver 14'. A control unit 15 controls transmitters 16, 16', receivers 14 and 14' and synthesizers 21 and 21'. ROM 18 stores identifying information utilized to control connections to the radio telephone sets 5 and 5', while a random access memory device (RAM) 34 stores a control signal for controlling the control unit 15. Information stored in ROM 18 and RAM 34 is sent to control unit 15 via a bus line 35.

Radio telephone sets 5 and 5' are connected to the master apparatus through radio channels, and their construction is shown in FIG. 8. A signal sent from the master apparatus 4 is received by antenna 11 and then input to receiver 19 via antenna duplexer 10. The output of the receiver is supplied to a handset 29 to be converted into a voice. A signal input to a microphone 30 is sent to master apparatus 4 via transmitter 8, antenna duplexer 10 and antenna 11. A synthesizer 20 determines the radio frequencies of receiver 19 and transmitter 8, while control unit 9 controls receiver 19, transmitter 8 and synthesizer 20. A loudspeaker 31 connected to synthesizer 20 produces a call tone, while a hook switch 7 is used to respond to a call originating or a call tone signal produced by loudspeaker 31.

The ROM 17 stores identifying information that identifies a predetermined radio telephone set, while information stored in ROM 17 corresponds to the information stored in ROM 18 of the master apparatus. An operation key switch unit 36 comprises an office line 1 selection key 36a for selecting an office line 1 (corresponding to a wired telephone channel connected to terminal 3), an office line 2 selection key 36b for selecting an office line 2 (corresponding to a wired telephone channel connected to terminal 3'), and a extension selection key 36c for selecting an extension and a preservation key preserving an office line. There are also provided display lamps (light-emitting diodes) 36e, 36f and 36g displaying the states of use corresponding to office line 1 selection key 36a, office line 2 selection key 36b and an extension selection key 36c, respectively.

The operation of this embodiment will be described with reference to the flow charts shown in FIGS. 9 through 11.

Figure 9:
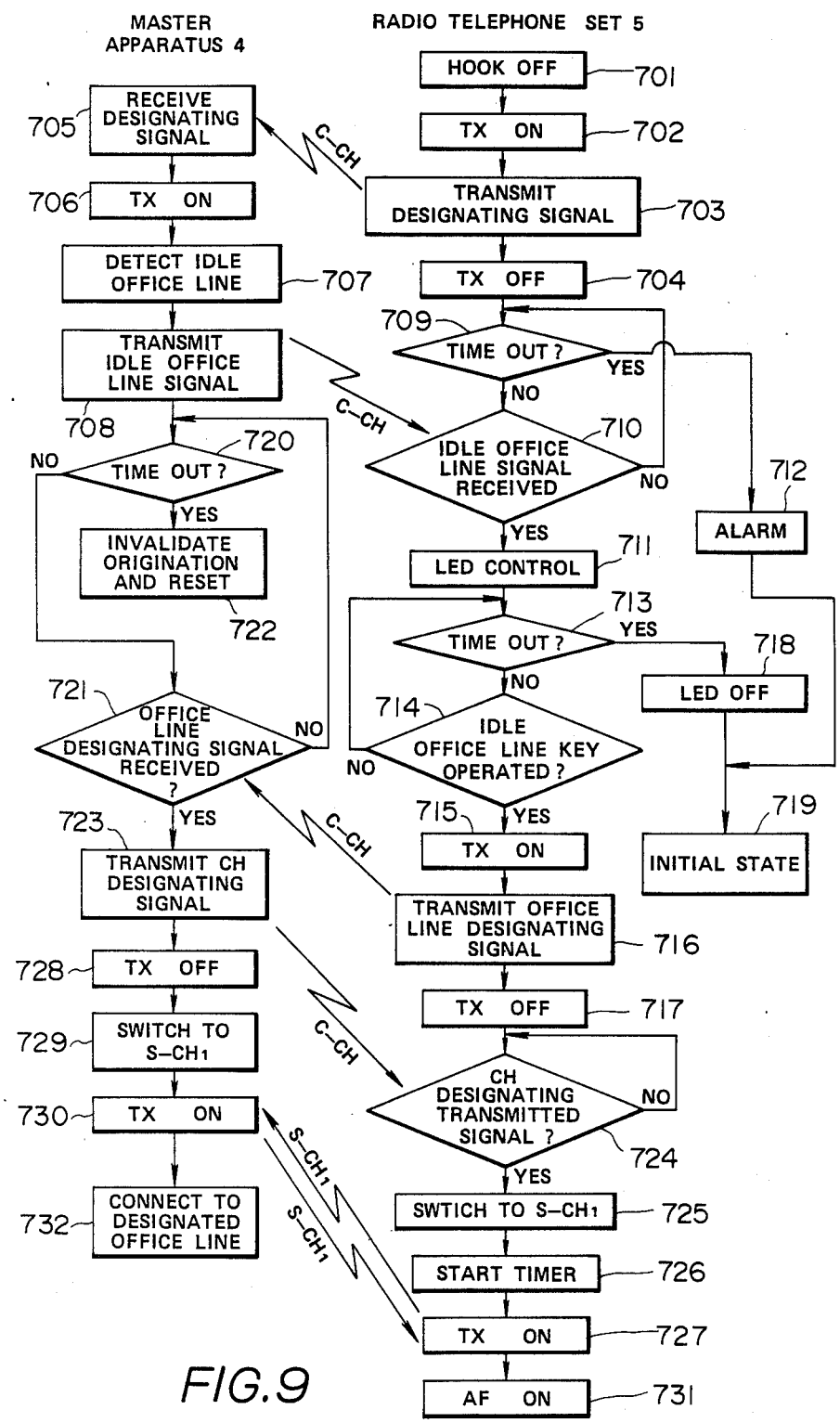
FIGS. 9 through 11 are flow charts showing the operation of the embodiment shown in FIGS. 7 and 8.

FIG. 9 shows a flow chart of a case wherein radio telephone set 5 originates a call. At step 701, when the hook switch 7 of the radio telephone set 5 is set to off-hook, this state change is detected by control unit 9 which turns ON transmitter 8 at step 702 and then supplies a call origination signal to the master apparatus 4 via antenna duplexer 10 and antenna 11 at step 703. Sending out of the call origination signal from radio telephone set 5 to the master apparatus 4 is done by using control channel (C-CH). When the sending out of the call origination signal completes, the control unit 9 turns OFF the transmitter 8 at step 704.

Receiver 14 of the master apparatus 4 receives the call origination signal from radio telephone set 5 through antenna 12, and antenna duplexer 13. Further, the call origination signal is received by receiver 14' via antenna 12' and antenna duplexer 13' at step 705, and the demodulated output of the receiver is supplied to the control unit 15. As a consequence, the control unit 15 turns ON transmitter 16 or 16' at step 706 and detects idle one of office lines 1 and 2 at step 707. Thereafter, a signal representing a detected idle office line member is sent to radio telephone set 5 through control channel (C-CH) at step 708.

At step 704, after turning OFF transmitter 8, the radio telephone set 5 judges whether a predetermined interval has elapsed or not at step 709. When it is judged that the predetermined interval has not yet elapsed, that is, a time out has not occurred, the program is transferred to step 710 at which a judgement is made as to whether an idle office line signal has been received from the master apparatus or not. At step 710, if it is judged that no idle office line signal is received from the master apparatus 4, the program is returned to step 709. At step 710, when it is judged that the idle office line signal has been received, the program is transferred to step 711 for controlling the flashing of the light-emitting diode (36e or 36g shown in FIG. 8) corresponding to the idle office line. The flashing of the light-emitting diode informs to an originated radio telephone set the fact that which one of the office lines is idle. At step 709, when it is judged that the timer has timed out, the program is transferred to step 712 for producing an alarm tone. After that the program is transferred to step 719, thus resuming the initial state.

At step 711, when the light-emitting diodes are lighted, at step 713, a judgement is made as to whether the predetermined interval has elapsed (time out) or not. At this step, if it is judged that there is no time out, at step 714, a judgement is made as to whether there is an operation of an idle office line key. This embodiment is constructed such that the call-originating radio telephone set 5 can select an office line utilized for the speech by operating an office line key (office line key 1 or key 2) corresponding to the light-emitting diode which is caused to flash in accordance with an idle office line signal from the master apparatus 4. Accordingly, an operator of the radio telephone set 5 would operate an office line key of a flashing light-emitting diode. By operating an office line key corresponding to a flashing light-emitting diode, the diode is lighted continuously.

At step 714, when it is judged that an idle office line key has operated, at step 715 the transmitter 8 is turned ON. Then the program is advanced to step 716 for sending out an office line designating signal corresponding to the operated office line key and thereafter the transmitter 8 is turned OFF at step 717. The transmission of the office line designating signal is done by using the control channel (C-CH). When the time out is judged at step 713, at step 18, the flashing light-emitting diode is turned OFF. Then the program is transferred to step 719 to resume the initial state.

After transmitting an idle office line signal at step 708, the master apparatus makes a judgement as to whether a predetermined interval has elapsed or not at step 720. When it is judged that the predetermined interval has not elapsed, that is, there is no time out, the program is transferred to step 721 at which a judgement is made as to whether an office line designating signal has been received from radio telephone set 5 or not. When the result of judgement of this step is NO, the program is returned to step 720.

At step 721, when it is judged that the office line designating signal has been received, at step 723, a channel designating signal that designates a predetermined speech channel is sent to radio telephone set 5 through the control channel. At step 720, when it is judged that there is a time out, at step 722, an origination invalidating processing and a predetermined resetting processings are executed.

At step 724, in the radio telephone set 5, a judgement is made as to whether a channel designating signal has been received or not. When the resulting of judgement is YES, the control unit 9 controls the synthesizer 20 for switching the radio frequency of the transmitter 8 and receiver 10 to that corresponding to a predetermined speech channel (S-CH$_1$) at step 725. Then at step 726, the timer is operated, and after a predetermined interval the transmitter 8 is turned ON at step 727.

At step 723, when the master apparatus terminates sending out of the channel designating signal, at step 728, transmitter 16 or 16' is turned OFF, and at step 729, the transmission/reception radio frequency is switched to that corresponding to the speech channel (S-CH$_1$) by controlling synthesizer 21 or 21'. Then at step 730, the transmitter 16 or 16' is turned ON, whereby a speech becomes possible between the master apparatus and radio telephone set 5 through speech channel (S-CH$_1$).

At step 727, after turning ON transmitter 8, at step 731, the radio telephone set 5 turns ON the audio frequency circuit of transmitter 8 and receiver 19. At step 730, after the master apparatus 4 has turned ON transmitter 16 or 16', the apparatus 4 connects the radio telephone set 5 to the designated office line designated by controlling cross-point 32.

Figure 10:
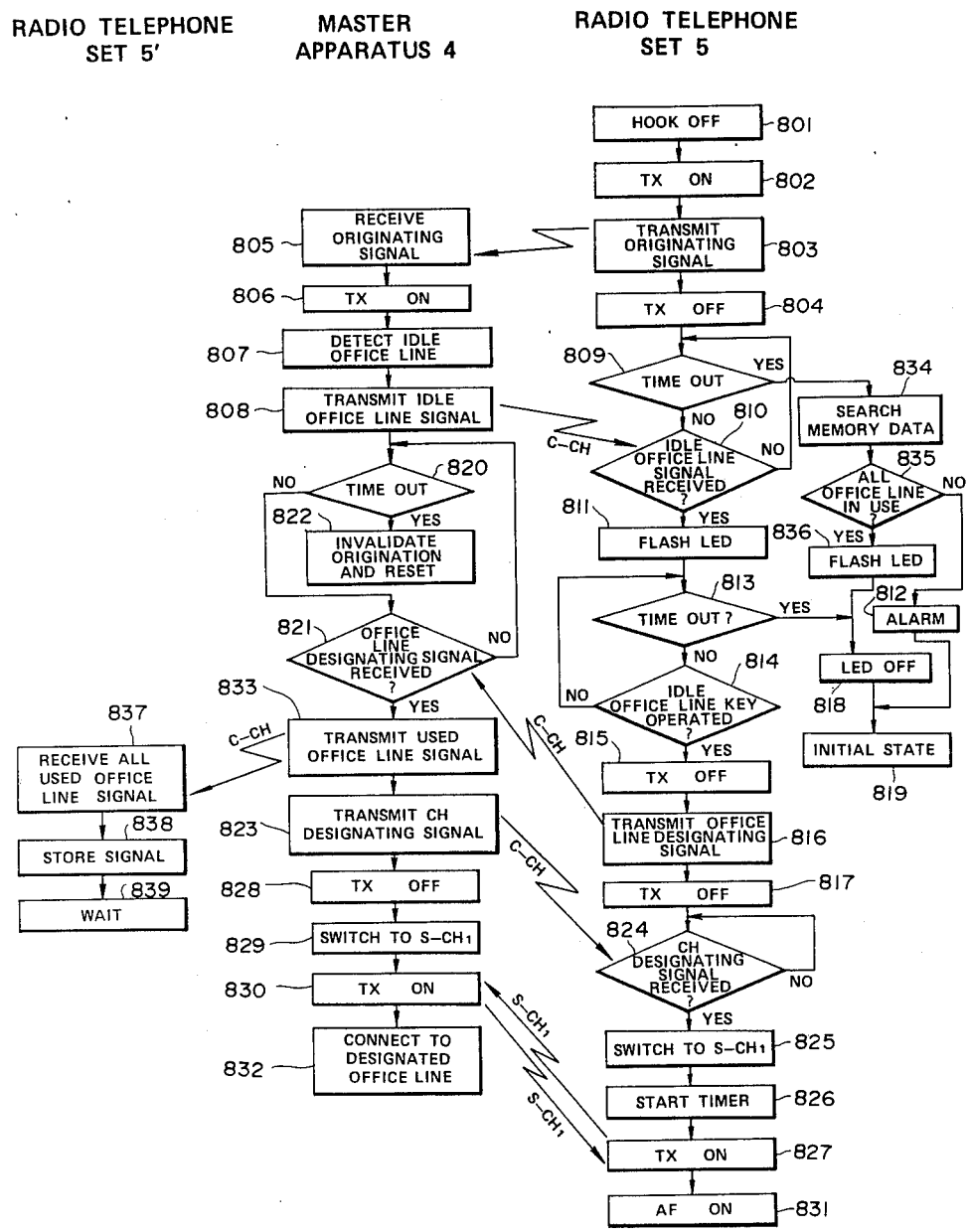

FIG. 10 shows another flow chart of a case where a call is originated by radio telephone set 5. This flow chart is different from the flow chart shown in FIG. 9 in that when the master apparatus receives an office line designating signal from an originated radio telephone set 5. The master apparatus sends a used office line signal to the other radio telephone set 5' radio telephone set 5' receives and stores the used office line signal, so that at the time of origination of a call, the state of use of the office line can be determined based on the stored signal. More particularly, at step 801 when the hook switch 7 of radio telephone set 5 is set to off-hook, this state change is detected by the control unit 9 which turns ON transmitter 8 at step 802. At step 803, a call origination signal is sent to the master apparatus 4 through control channel (C-CH). Thereafter, at step 804, transmitter 8 is turned OFF.

At step 805, when the call origination signal from the radio telephone set 5 is received, the master apparatus 4 turns ON transmitter 16 or 16' at step 806. At step 807 an idle one of office lines 1 and 2 is detected. Then at step 808, a signal representing the detected idle office line number is sent to the radio telephone set 5 through control channel (C-CH).

At step 804 after turning OFF the transmitter 8, the radio telephone set 5 judges whether predetermined interval has elapsed or not at step 809. When it is judged that the predetermined time has not elapsed, that is, no time out has occurred, at step 810, a judgement is made as to whether an idle office line signal has been received from the master apparatus 4 or not. When the result of judgement is NO, the program is returned to step 809. When the result of judgement at step 810 is YES, at step 811 the light-emitting diode (36c or 36g shown in FIG. 8) corresponding to the idle office line is caused to flash to inform the radio telephone set originating the call of which one of the office lines is idle. At step 809, if a time out is judged, at step 834, data stored in a used office line memory device, not shown, storing used office line data are searched. Then at step 835, a judgement is made as to whether all office lines are being used or not based on the result of the search. When all office lines are not used, at step 812, an alarm tone is generated on the assumption that an abnormal condition has occurred. Then at step 819, the state is returned to the initial state.

At step 835, when it is judged that all office lines are now being used, at step 836, light-emitting diodes (36c and 36g) are caused to flash to signal that all office lines are now being used. Then at step 818, these light-emitting diodes are turned OFF, and at step 819 the initial state is resumed.

After flashing the light-emitting diodes at step 811, a judgment is made as to whether a predetermined interval has elapsed (time out) or not at step 813. If it is judged that no time out has occurred, at step 814, a judgement is made as to whether an idle office line key has been operated or not.

When the judgement at step 814 shows that an idle office line key has been operated, at step 815, the transmitter 8 is turned ON, and then at step 816, an office line designating signal corresponding to an operated key is transmitted through the control channel (C-CH). When the judgment at step 813 shows a time out, at step 818 the flashing light-emitting diodes are extinguished and then at step 819, the initial state is resumed.

On the other hand, at step 80, after transmitting the idle office line signal, the master apparatus 4 judges as to whether a predetermined interval has elapsed or not at step 820. If the result of the judgment is NO, at step 821, a judgment is made as to whether an office line designating signal 2 from the radio telephone set 5 has been received or not. If the signal 2 is not yet received, the program is returned to step 820, whereas when the signal 2 has been received, at step 833, the office line data represented by the office line designating signal is set to the radio telephone set 5' as a used office line signal.

At step 837, when the radio telephone set 5' receives the used office line signal, the received signal is stored in a used line memory device, not shown, at step 838, and then at step 859, the state is brought to the waiting state. Where the result of judgement at step 820 shows a time out, a call origination invalidation process and a predetermined resetting process are executed.

At step 833, after transmitting a used office line signal, at step 823, a channel designating signal for designating a predetermined speech channel is sent to radio telephone set 5 through the control channel.

At step 824, the radio telephone set 5 judges whether the channel designating signal has been received or not. When it is judged that the channel designating signal has been received, the radio frequency of transmitter 8 and receiver 19 is switched to that corresponding to speech channel (S-CH$_1$) at step 825. Then at step 826, a timer is started, and after a predetermined interval, transmitter 8 is turned ON at step 827.

At step 823, when transmission of the channel designating signal is terminated, at step 828, the transmitter 16 or 16' is turned OFF. Then at step 829, by controlling the synthesizer 21 or 21', the transmission/reception radio frequency is switched to that corresponding to speech channel (S-CH$_1$). Then at step 830, transmitter 16 or 16' is turned ON, whereby speech between the master apparatus 4 and the radio telephone set 5 becomes possible by using the speech channel (S-CH$_1$).

At step 827, after turning ON transmitter 8, the radio telephone set 5 turns ON the audio frequency circuit of transmitter 8 and receiver 19 at step 831.

At step 830 after turning ON transmitter 16 or 16', the master apparatus 4 controls the cross-point 32 so as to connect the radio telephone set 5 to an office line designated by the telephone set 5.

In this embodiment, at the time of terminating the speech, the master control apparatus 4 sends a signal showing that an office line now being used becomes idle through the control channel (C-CH). In response thereto, the radio telephone set changes the content of the used office line memory device.

Figure 11:
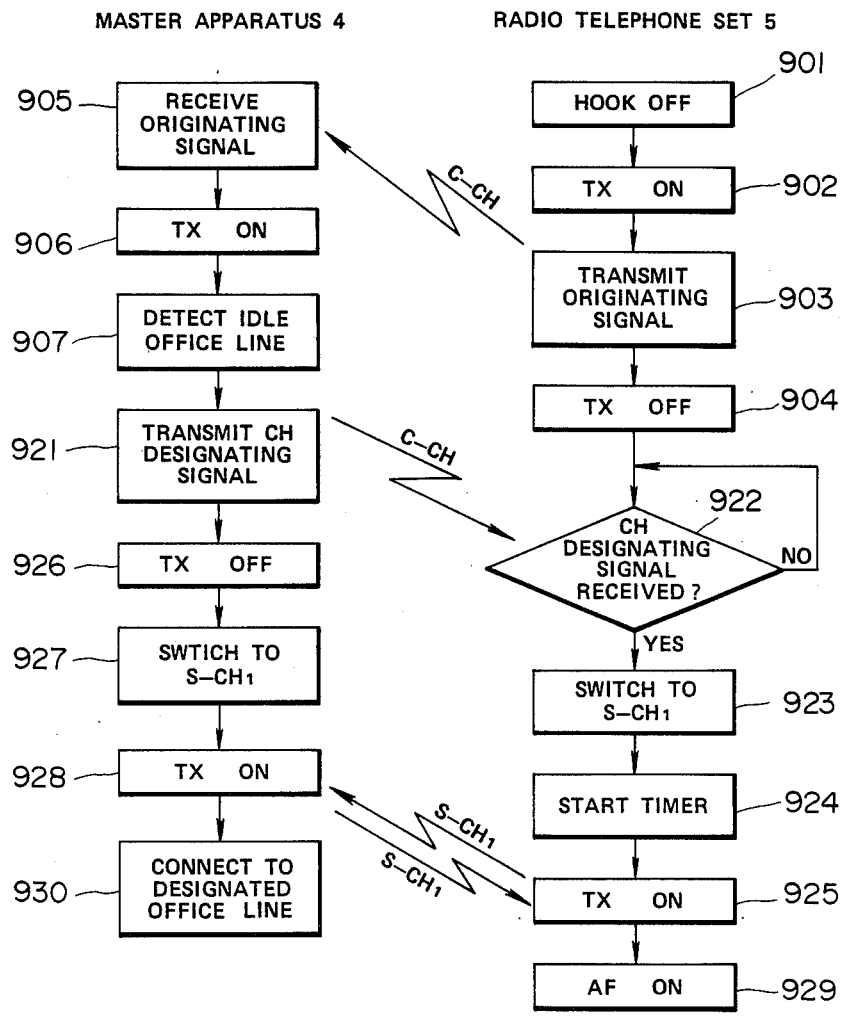

FIG. 11 shows still another flow chart showing the operation of a case wherein a call is originated by the radio telephone set. This flow chart is constructed such that when the master apparatus 4 receives an origination signal from the radio telephone set 5, the master apparatus connects to an idle office line without sending out an idle office line signal to the radio telephone set 5. More particularly, at step 901, when the hook switch 7 of the radio telephone set 5 is set to off-hook, at step 902, the transmitter 8 is turned ON and then at step 903, a call origination signal is sent to the master apparatus 4 through control channel (C-CH). After that, at step 904, the transmitter 8 is turned OFF.

At step 905 when the master apparatus 4 receives an origination signal from the radio telephone set 5, transmitter 16 or 16' is turned ON at step 906, and at step 907 an idle one of the office lines 1 and 2 is detected. Then at step 921, a channel designating signal for designating a predetermined speech channel is sent to radio telephone set through the control channel.

In the radio telephone set, judgement is made as to whether a channel designating signal has been received at step 922. When it is judged that the channel designating signal has been received, at step 923, the radio frequency of transmitter and receiver 19 is switched to that corresponding to a predetermined speech channel (S-CH$_1$). Then at step 924, the timer is started and when a predetermined interval has elapsed, at step 925, transmitter 8 is turned ON. When the sending out of the channel designating signal has terminated at step 921, the master apparatus turns OFF transmitter 16 or 16' at step 926, then at step 927, the transmission/reception radio frequency is switched to that corresponding to the speech channel (S-CH$_1$). Then at step 928, transmitter 16 or 16' is turned ON thereby enabling speech between the master apparatus 4 and the radio telephone set 5 by using the speech channel (S-CH$_1$).

At step 925, after turning ON transmitter 8, the radio telephone set 5 turns on the audio frequency circuit of transmitter 8 and receiver 19 at step 929.

At step 928 after turning ON transmitter 16 or 16', at step 930 the master control apparatus 4 connects the radio telephone set 5 to the designated office line.

What is claimed is:

1. A radio telephone system control apparatus comprising:
    a plurality of radio telephone sets, each having a slave radio set;
    a master apparatus connected to a subscriber line and including a master radio set which exchanges signals between said slave radio set in each of said radio telephone sets and said master apparatus;
    means responsive to a call origination operation of any one of said radio telephone sets for sending a call originating signal from said slave radio set of a call originating one of said radio telephone sets to the master radio set of said master apparatus;
    means responsive to said call originating signal for sending a channel designating signal to said slave radio set in each of said radio telephone sets from said master radio set of said master apparatus and for switching a radio channel of said master radio set of said master apparatus to said radio channel corresponding to said channel designating signal;
    means responsive to said channel designating signal for switching the radio channel of the slave radio set in each of said radio telephone sets to that corresponding to said channel designating signal;
    whereby connection control of said radio telephone set and a subscriber line is effected by a single master apparatus based on said call origination operation of any one of a plurality of radio telephone sets.

2. The radio telephone system control apparatus according to claim 1 wherein the channel designating signal from the master radio set of said master apparatus to said slave radio set of said radio telephone sets is sent to all slave telephone sets of said radio telephone sets so that the radio channels of the slave radio sets of all radio telephone sets are switched to a radio channel corresponding to said channel designating signal.

3. The radio telephone system control apparatus according to claim 1 wherein sending out of said channel designating signal to said slave radio sets of said radio telephone sets from the master radio set of said master apparatus is done for only the slave radio set of said call originating radio telephone set, so that only the radio channel of the slave radio set of the call originating radio telephone set is switched to a radio channel corresponding to said channel designating signal.

4. The radio telephone system control apparatus according to claim 1 which further comprises means responsive to said call originating signal for sending a call signal to the slave radio set of a called radio telephone set other than the call originating radio telephone set, and means responsive to said call signal for sending a call response signal from the slave radio set of said called radio telephone set to the master radio set of said master apparatus.

5. The radio telephone system control apparatus according to claim 4 wherein said channel designating signal is sent to the slave radio set of said called radio telephone set from the master radio telephone set of said master apparatus only after the call response signal from the slave radio set of said called radio telephone set has been generated in response to said call signal.

6. The radio telephone system control apparatus according to claim 4 wherein when the fact that a call response signal from the slave radio set of said called radio telephone set is generated in response to said call signal is not confirmed, said channel designating signal is sent to the slave radio set of said called radio telephone set from the master radio set of said master apparatus, a predetermined interval after sending out said call signal.

7. The radio telephone system control apparatus according to claim 1 wherein said channel designating signal sent to the slave radio set of said radio telephone set from the master radio set of said master apparatus is added with an identifying code for identifying an addressed radio telephone set.

8. The radio telephone system control apparatus according to claim 1 wherein said call signal sent to the master radio set of said master apparatus from the slave radio set of said call originating radio telephone set is added with an identifying code for identifying said call originating radio telephone set.

9. The radio telephone system control apparatus according to claim 4 wherein said call signal sent to the slave radio set of said called radio telephone set from the master radio set of said master apparatus is added with an identifying code that identifies an addressed radio telephone set.

10. The radio telephone system control apparatus according to claim 4 wherein the call response signal sent to the master radio set of said master apparatus from the slave radio set of said called radio telephone set is added with an identifying code for identifying the radio telephone set which has sent out said call response signal.

11. The radio telephone system control apparatus according to claim 1 wherein a radio channel of said master radio set of said master apparatus is switched to a control channel when said master radio set is in a waiting state, and wherein the radio channel of the master radio set of said master apparatus is switched to a speech channel from said control channel in response to said channel designating signal.

12. The radio telephone system control apparatus according to claim 1 wherein a radio channel of said master radio set of said master apparatus is switched to a predetermined speech channel when said master radio set is in a waiting state and wherein the radio channel of the master radio set of said master apparatus is switched from said predetermined speech channel to an other speech channel in response to said channel designating signal.

13. A radio telephone system control apparatus comprising:
- a plurality of radio telephone sets each having a slave radio set;
- a master apparatus including a master radio set connected to at least one subscriber line for exchanging signals between said master apparatus and the slave radio set in each of said radio telephone sets;
- means responsive to a call origination operation of any one of said radio telephone sets for sending a call originating signal to the master radio set of said master apparatus from the slave radio set of a call originating one of said radio telephone sets;
- means responsive to said call originating signal for detecting a state of use of a subscriber line connected to said master apparatus for sending an idle office line signal representing an idle subscriber line to said slave radio set of said call originating radio telephone set from said master radio set of said master apparatus;
- means responsive to said idle office line signal for displaying an idle subscriber line on said call originating radio telephone set;
- means for sending an office line designating signal from the slave radio set of said call originating radio telephone set to the master radio set of said master apparatus in accordance with a selection of the idle subscriber line of said call originating radio telephone set;
- means responsive to said office line designating signal for sending a channel designating signal to the slave radio set of said call originating radio telephone set from the master radio set of said master apparatus and for switching the radio channel of the master radio set of said master apparatus to a radio channel corresponding to said channel designating signal;
- thereby controlling the connection of a radio telephone set and a subscriber line corresponding to an office line designating signal with a single master apparatus in accordance with a call origination operation by any one of a plurality of radio telephone sets.

14. The radio telephone system control apparatus according to claim 13 wherein the sending out of the channel designating signal to the slave radio set of said call originating radio telephone set from the master radio set of said master apparatus is made only to the slave radio set of the call originating radio telephone set so that only the radio channel of the slave radio set of the call originating radio telephone set is switched to a radio channel corresponding to said channel designating signal.

15. The radio telephone system control apparatus according to claim 13 wherein an idle office line signal and a channel designating signal which are sent from the master radio set of said master apparatus to the slave radio set of said call originating radio telephone set include identifying codes that identify an addressed radio telephone set.

16. The radio telephone system control apparatus according to claim 13 wherein said originating signal and said office line designating signal which are sent from the slave radio set of said call originating radio telephone set to the master radio set of said master apparatus include identifying codes that identify the addressed call originating radio telephone set.

17. The radio telephone control apparatus according to claim 13 which further comprises means for generating an alarm when the slave radio set of said call originating radio telephone set does not receive an idle office line signal from the master radio set of said master apparatus within a predetermined interval after sending out said call originating signal.

18. The radio telephone system control apparatus according to claim 13 further comprising means responsive to said office line designating signal for sending a busy office line signal representing a busy subscriber line to the slave radio set of one of said radio telephone sets other than said call originating radio telephone set, and means provided for respective radio telephone sets, for storing an indication of the busy subscriber line in response to said used office line signal.

19. The radio telephone system control apparatus according to claim 18 further comprising means for searching the contents of said means for storing when the slave radio set of said call originating radio telephone set does not receive said idle office line signal from the master radio set of said master apparatus in a predetermined interval after sending out said paging signal, means for displaying said idle telephone channel when an idle subscriber line is detected by said search means, and means for generating an alarm when said search means fails to detect said idle subscriber line.

20. A radio telephone system control apparatus, comprising:
- a plurality of radio telephone sets, each including a slave radio set;
- a master apparatus including a master radio set connected to at least one wired telephone channel for exchanging signals between the slave radio set of said radio telephone sets and said master radio set;
- means responsive to a call origination operation by any one of said radio telephone sets for sending a call originating signal from said slave radio set in a call originating one of said radio telephone sets to the master radio set of said master apparatus;

detecting means responsive to said call originating signal for detecting the state of use of a subscriber line connected to said master apparatus;

means for sending a channel designating signal to the slave radio set of said radio telephonesets from the master radio set of said master apparatus when an idle subscriber line is detected by said detecting means;

means for switching a radio channel of the master radio set of said master apparatus to a radio channel corresponding to said channel designating signal;

means responsive to said channel designating signal for switching the radio channel of the slave radio set of said call originating radio telephone set to a radio channel corresponding to said channel designating signal, whereby the connection control, based on said call origination operation by any one of said radio telephone sets, between said call originating radio telephone set and a subscriber line is effected by a single master apparatus.

21. A method of controlling a radio telephone system of the type wherein connections between a subscriber line and a plurality of radio telephone sets are controlled by a single master apparatus, said method comprising the steps of:

sending a call originating signal from a call originating one of said radio telephone sets to said master apparatus when any one of said radio telephone sets originates a call;

connecting a radio channel of said master apparatus and radio channels of all radio telephone sets to the same channel when a call originating signal is generated by said call originating radio telephone set;

establishing a speech channel between said call originating radio telephone set and a subscriber line connected to said master apparatus.

22. A method of controlling a radio telephone system of the type wherein connections between a subscriber line and a plurality of radio telephone sets are controlled by a single master apparatus connected to at least one subscriber line, said method comprising the steps of:

sending a call originating signal to said master apparatus from a call originating one of said radio telephone sets when any one of said radio telephone sets originates a call;

in response to said call originating signal, detecting a state of use of a subscriber line connected to said master apparatus;

sending an idle office line signal representing an idle subscriber line to said call originating radio telephone set from said master apparatus;

displaying said idle telephone channel in response to said idle office line signal in said call originating radio telephone set;

sending an office line designating signal to said master apparatus from said call originating radio telephone set when an idle subscriber line for said call originating radio telephone set is detected;

sending a channel designating signal to said radio telephone sets from said master apparatus in response to said office line designating signal;

switching a radio channel of said master apparatus to a radio channel corresponding to said channel designating signal;

switching the radio channel of said call originating radio telephone set to a radio channel corresponding to said channel designating signal in response to said channel designating signal; and establishing a speech channel between said call originating radio telephoneset and said selected subscriber line.

23. A method of controlling a radio telephone system of the type wherein connections between a wired telephone channel and a plurality of radio telephone sets are controlled by a single master apparatus connected to at least one subscriber line, said method comprising the steps of:

sending an origination signal to said master apparatus from a call originating one of said radio telephone sets in response to a call origination operation by any one of said radio telephone sets;

detecting a state of use of said subscriber line connected to said master apparatus in response to said call originating signal;

sending a channel designating signal to said radio telephone sets from said master apparatus when said idle telephone channel is detected;

switching the radio channel of said master apparatus to a radio channel corresponding to said channel designating signal; and establishing a speech channel between said call originating radio telephone set and said detected idle subscriber line.

24. A radio telephone system control apparatus comprising:

a plurality of slave units, each including a first transmitting means for transmitting a call originating signal over a control channel in response to actuation by an operator;

a master unit connected to an exchanger through at least one subscriber line and including at least one second transmitting means for transmitting a channel designating signal over said control channel;

switching means provided in said master unit for autonomously switching said control channel to a speech channel designated by said channel designating signal in response to said call originating signal; and means responsive to said channel designating signal for switching said plurality of slave units from said control channel to a speech channel to establish two way voice communication with said master unit.

* * * * *